United States Patent [19]

Nishimura

[11] Patent Number: 5,487,868
[45] Date of Patent: Jan. 30, 1996

[54] TIN BASED SOLDER ALLOY CONTAINING LEAD, ANTIMONY, AND TELLURIUM

[75] Inventor: Tetsuro Nishimura, Osaka, Japan

[73] Assignee: Nihon Superior Co., Ltd., Osaka, Japan

[21] Appl. No.: 234,067

[22] Filed: Apr. 28, 1994

[30] Foreign Application Priority Data

Mar. 9, 1994 [JP] Japan .................................. 6-066676

[51] Int. Cl.⁶ .................................................. C22C 13/00
[52] U.S. Cl. ............................ 420/559; 228/262.9
[58] Field of Search ................................ 420/559, 558; 228/262.9

[56] References Cited

U.S. PATENT DOCUMENTS

| | | | |
|---|---|---|---|
| 3,793,161 | 2/1974 | Manko | 420/558 |
| 4,734,256 | 3/1988 | Liebermann et al. | 420/571 |
| 4,869,871 | 9/1989 | Kawai et al. | 420/559 |
| 4,937,045 | 6/1990 | Silverman | 420/559 |
| 5,308,578 | 5/1994 | Wong | 420/559 |

OTHER PUBLICATIONS

Vianco et al Jour. of Metals, Jul. 1993, pp. 14–19.

*Primary Examiner*—David A. Simmons
*Assistant Examiner*—Margery S. Phipps
*Attorney, Agent, or Firm*—Thompson, Hine and Flory

[57] ABSTRACT

The invention is a solder alloy which can alleviate the fatigue rupture which occurs at a soldered joint due to a heat cycle. The solder alloy also shows effective use of the addition of Cu. This solder alloy comprises 57 to 65% Sn, 0.1 to 0.5% Sb, 0.002 to 0.05% Te and the balance being lead, wherein all percentages are by weight. The solder alloy of the present invention also supplements the base composition with 0.001 to 0.05% by weight Ga and/or 0.1 to 0.3% by weight Cu.

2 Claims, 4 Drawing Sheets

TIN BASED SOLDER ALLOY CONTAINING LEAD, ANTIMONY, AND TELLURIUM

BACKGROUND OF THE INVENTION (1) Field of the Invention

This invention relates to the improvement of a solder alloy to be used for joining electronics components to printed circuit boards for electronics apparatus and the like. More particularly, this invention relates to a solder ally to assuage the phenomenon of fatigue rupture which occurs on a soldered joint exposed to a heat cycle stress for a long duration of time.

(2) Description of the Prior Art

A solder is a material primarily used for electrically or mechanically joining the plural number of parts, making use of metallurgical phenomenon of wetting. Among Sn—Pb solder alloys, one which has traditionally been used for assembling electronics apparatus or mounting electronics components is an eutectic solder with comparatively low melting point (Sn 63 wt %; Pb 37 wt %; melting point of approx. 183° C.). The reason that such solder is used is because the compensation temperature is low for the heat resistance of electronics components, printed circuit boards, resin materials, etc.

An alloy soldered at a joint section is exposed to the stress omnidirectionally inflicted by compression, tensile, shearing or twisting produced by heat cycle which is caused by heating and cooling alternately repeated when turning on and off the electronics apparatus or by rise and fall of environmental temperature. The shifting of structure and re-crystallization are repeated within a solder alloy, off-setting the stress inflicted upon it. More particularly, the conspicuous growth of coarse crystallization is observed when the solder temperature rises almost as high as the solidus temperature or when it receives a severe cyclic stress. It is also noted that the stress caused by compression grows bigger, because the crystal turns harder and the shifting speed gets slower as a solder cools off. When the structure of a crystal has become no longer resistible to the stress, wrinkles occur over the inflicted area due to fatigue rupture and fissures appear with the growth of wrinkles. When the fissures start growing bigger, cracks can be observed outwardly.

An electrical resistance increases when cracks occur on a soldered joint, the temperature starts to rise with the flow of electric current generated when turned on, thereby lowering the mechanical strength. As a result, the cracks grow increasingly deep and wide to bring the primary purpose of joining materials to naught. Furthermore, since the electrical properties can also be deteriorated, it may jeopardize a proper function of an apparatus, or, for the worst case, it may generate spark or arc caused by the flow of electric current and induce ignition. More particularly, the matter of heat stress is of extreme importance in dealing with equipment driven by direct current or high voltage such as a new type of invertor apparatus, or car electronics which are to be exposed to severe circumstances, to say nothing of machineries and equipment used for daily life. It is indispensable to develop a soldering material excelling in the properties of heat resistance.

A solder alloy consisting of 90% of Sn, 9% of Cd and 1% of Zn, all in weight, with melting point of 238° to 260° C. is popular. Also popular is a solder alloy consisting of 95% of Sn and 5% of Sb in weight with melting point of 235° to 240° C. And further, Sn—Pb based solder added with either Cd, Ag, Bi, Cu, Au, Pd, Ni, Zn, In, As or Ca, Sn—Pb—Bi based solder, Sn—Pb—Sb based solder or a slight amount of Ag or Cu added Sn—Pb—Sb based solder is the alloy widely known (for example, Japan Publication Gazette SYO 49-21028, SYO 49-23986, SYO 53-113245, etc.).

Among the conventional solder alloys, for the solder which composition largely differs from that of an eutectic solder with melting point of 183° C., a substantial change is required in its soldering temperature. Otherwise, there may occur the problems of work efficiency. Another problem involved is the fact that the thermal restriction by a heat resistance inherent in electronics components can not be dodged. Furthermore, there exists the problem with Sn—Pb—Bi based solder that the scope of application is limited because of its inferior creeping properties at high temperature and the deficiency in its shock resisting properties, although the solder with a low melting point suffice the conditions for the heat resistance temperature inherent in electronics components. More particularly, although the art to add Ga has already been practiced in some of the conventional arts mentioned above, there is no solid foundation to justify adding Ga nor specific guidance to specify the amount of an element to add. There exists no established standard available.

Another defect is that, depending on an element to be added, the impurities can be seen when a solder is dissolved, frequently causing poor soldering such as formation of bridges, icicles, etc. or producing solder dross in a large quantity. Particularly, no logical foundation to justify adding Cu is valuable, despite the fact that the art to add such element was introduced in the past. In the field of solder alloys, one which is widely known is Pb solder added with Cu for purpose of improving the flexibility inherent in Pb. On the contrary, when Cu is added to a solder alloy containing Sn, Sn—Cu intermetallic compounds are produced and the alloy becomes brittle. It is therefore generally recommended to avoid adding Cu.

SUMMARY OF THE INVENTION

The object of this invention is to offer a solder alloy capable enough to slow the occurrence of fatigue rupture at a soldered joint due to a heat cycle stress. Another object is to prolong the life of electronics apparatus and improve the reliability by offering this inventive solder alloy for use. A further object of this invention is to explore the effective use of Cu-added solder by analyzing the long implanted concept that adulteration of Cu should be avoided.

The invention attains these objects by formulating a solder composition which comprises 57 to 65% of Sn, 0.1 to 0.5% of Sb, 0.002 to 0.05% of Te and balancing Pb, all in weight. Additionally formulated is a solder composition which comprises 0.001 to 0.05% of Ga in weight in addition to the said distribution. Furthermore, a solder containing 0.1 to 0.3% of Cu in weight is also used as a means to attain the objects.

The properties of a heat resistance cycle stress of a Sn—Pb solder can be improved by either softening the hardness to avoid a stress accumulated on a certain area, increasing the hardness to raise the strength to the contrary, or reducing intergranular to make the crystal grow larger. In order to make the crystal structure of conventional Sn—Pb solder resistible to a heat cycle stress without making a large alteration in its melting range, this invention allows not only to add Sb, Te and Ga to its solder composition in weight % as above mentioned but to mix Cu which was considered to be dodged.

The reason to set at 57% in weight for the lowest limit of Sn composition is because the liquidus temperature must be less that 200° C., taking into account the heat resisting temperature of electronics components, and the reason to set at 65% in weight for the upper limit is because the composition exceeding the said % distribution could raise the liquidus temperature and induce an adverse effect when assembling electronics components. Though the melting point of Sb is as high as 630° C., the element can be dissolved into Sn and Pb and dispersed in the solid, when almost 0.1 to 0.5% of Sb in weight is added. The hardness of the alloy can then be raised and its mechanical strength increased.

When added with Te, fine particles of intermetallic compounds built up between heterogeneous metals such as Pb—Te, Sn—Te and Sb—Te can be left and then minutely dispersed within a Sn—Pb solder alloy and effectively impede the growth of grain produced in the solid of Sn and Pb. Simultaneously, adding Te can act to jeopardize the growth of grains dispersed within Pb, reduce the influence caused by a stress which has occurred when the thermal and mechanical re-crystallization are repeated to the crystalline structure of Sn, Pb and Sb at the early stage, and keep trying to maintain the incipient condition. Addition of Sb and Te each in an adequate amount to a solder alloy effectively works well for the physical properties. In other words, it produces two effective actions at the same time, i.e. addition of Sb increases the hardness of an alloy, while addition of Te increases the viscosity of an alloy, impeding the growth of grains. Furthermore, in as much as the melting point of intermetallic compounds of Te is high, no dissolution takes place at the temperature ranging from 200° C. to 250° C., and the compounds start coming to the surface of molten solder and accumulated because of the difference in specific gravity with other metals contained in it. Consequently, even if Te is added in large quantities, a poor soldering can be produced due to solder dross or impurities which come out in excess, while the soldering effect remains the same and unchanged. Moreover, frequent cleaning of a solder bath will be required to be conducted and unnecessary labor needed for maintenance. This invention, taking these matters into consideration, determines 0.05% of Te in weight as a maximum amount of addition. The 0.002% in weight which is a minimum amount of addition is a limiting value for attaining the aforementioned effect of action. A soldered joint section is apt to impede the occurrence of re-crystallization at the time when exposed to a high temperature, since Te compounds curb the coarse growth of crystallization holding other atoms from shifting and also melting point is as high as approximately 900° C.

Addition of Ga for 0.001 to 0.05% in weight acts to restrain the growth of oxidized dross coming out on to the surface of a solder, while Ga tends to produce intermetallic compounds combined with Sb separately added. As in the case of Te compounds, it grows into a crystal nucleus during the process of founding and not only fractionizes the extensively expanding crystalline structure but also fortifies the intercrystalline. However, an excessive amount of addition of Ga is not at all recommended since it could cause to lower the melting point.

Furthermore, intermetallic compounds of Te or Ga combined with other metals is a stabilized substance which is bigger in size than other structural atom as Pb or Sb. The compound acts to disturb the atomic configuration of Sn, Pb or Sb when it remains within a grain. Therefore, when the coagulated structure mixed with Sb and Pb is re-crystallized, atoms act to avoid being methodically arranged. The intermetallic compounds act to accelerate the atoms to slip when a strain is weak. It has become clear that creeping tables place with a weaker stress when compared with an alloy not containing Te or Ga. Generally, it is widely known that the creep resistance increases when added with Sb. However, the effect of the said properties can vanish when added with Te and Ga.

Cu has long been considered the very metal to avoid to adding to Sn—Pb solder. This invention, however, encourages adding Cu. No adverse effect to its heat cycle resistance properties can be observed, even if Cu is added. The adulteration of Cu into a solder which often takes place is considered as a normal phenomenon when mounting electronics components on a printed circuit board applied with a Cu foil. The amount of Cu saturated within a Sn—Pb solder comprising 63% and 37% respectively with melting point between 240° C. and 250° C. is up to 0.5% at maximum. The saturated Cu in the solder grows intermetallic compounds of $Cu_6Sn_5$ between Sn and itself. The intermetallic compounds gathering around the grain boundaries form a very brittle layer at the time of solidification. As a result, it becomes no longer resistible to either repeated stress or the stress caused by shocks, finally producing cracks or fissures. Not like the conventional Sb—Pb solders, however, solder alloys added with Sb and Te or those further added with Ga in supplement have proved to be capable of impeding the accumulation of Cu intermetallic compounds being formed around the grain boundaries. This means the adverse effect caused by Cu can now be eliminated. Thanks to the physical properties mentioned in above, this inventive solder alloy not only keeps the properties of heat cycle resistance of a solder free from deterioration, but also controls the dispersion of Cu into a molten solder from the object to be soldered by producing near saturated atmosphere through positive addition of Cu into a solder alloy. Furthermore, this inventive solder prevents Cu from developing into high density layers and also enhance the joining strength at the surface.

It is not deniable that the impurities are contained in remainder, but its content ratio is left undiscussed specifically in this study.

DESCRIPTION OF THE PREFERRED
EMBODIMENTS

The result of experiment corroborates by itself the fact that this inventive solder alloy has a remarkably favorable properties.

Evaluation tests have been conducted on the composition of this inventive alloy as well as the composition of other alloy each in relation to the creeping and heat shock resistance properties. Results of these experiments are as follows;

EXAMPLE 1

Figure 1:
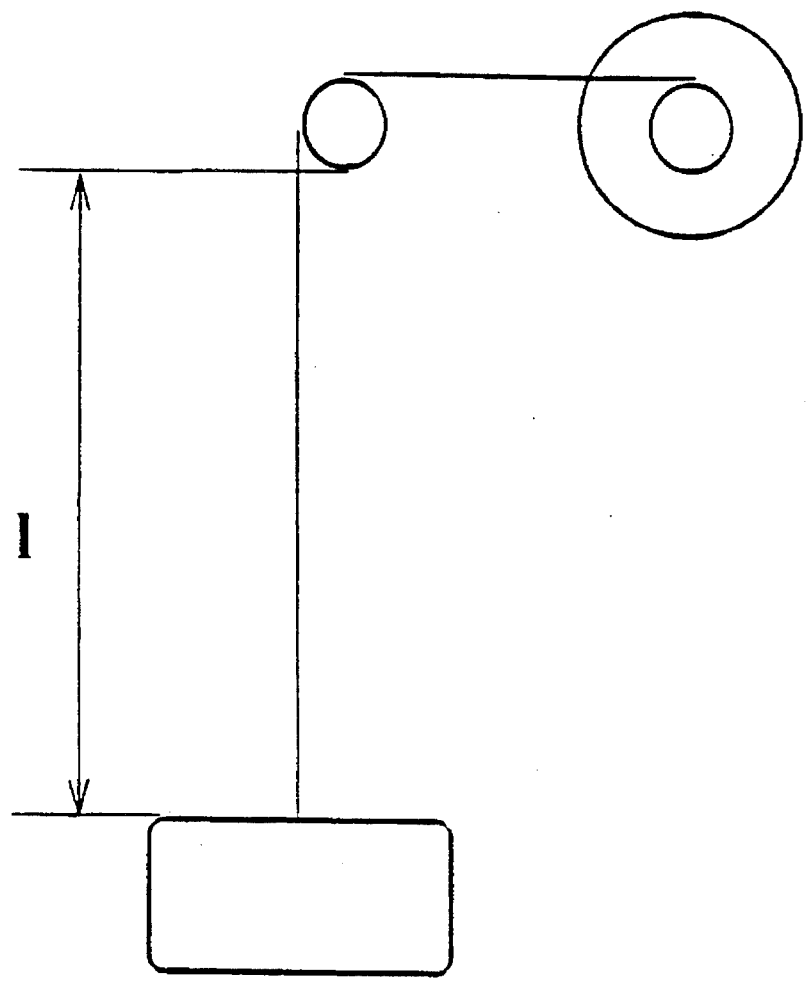
FIG. 1 is a profile of a test equipment prepared for embodiment of Example 1.

The Example 1 shows the test result on creeping properties. Used as a sample is a stick solder with diameter of 1.0±0.01 mm stored in a controlled room temperature for more than three months after manufactured. Since crystal of a stick solder was crushed when drawn during the manufacturing process, the material was required to be left for a long time for recovery in order to equalize the condition of each sample. Composition of the sample is as mentioned below. Each sample is assembled as illustrated in FIG. 1. The load of 7.3N/mm$^2$ is laid, setting the length between the fixed section and the built-up beam at 200 mm.

(Sample 1)

| Sn | 62.647% |
|---|---|
| Sb | 0.3% |
| Te | 0.05% |
| Ga | 0.003% |
| Pb | 37.0% |

(Sample 2)

| Sn | 63% |
|---|---|
| Pb | 37% |

(Sample 3)

| Sn | 63% |
|---|---|
| Sb | 0.3% |
| Pb | 36.7% |

Figure 2:
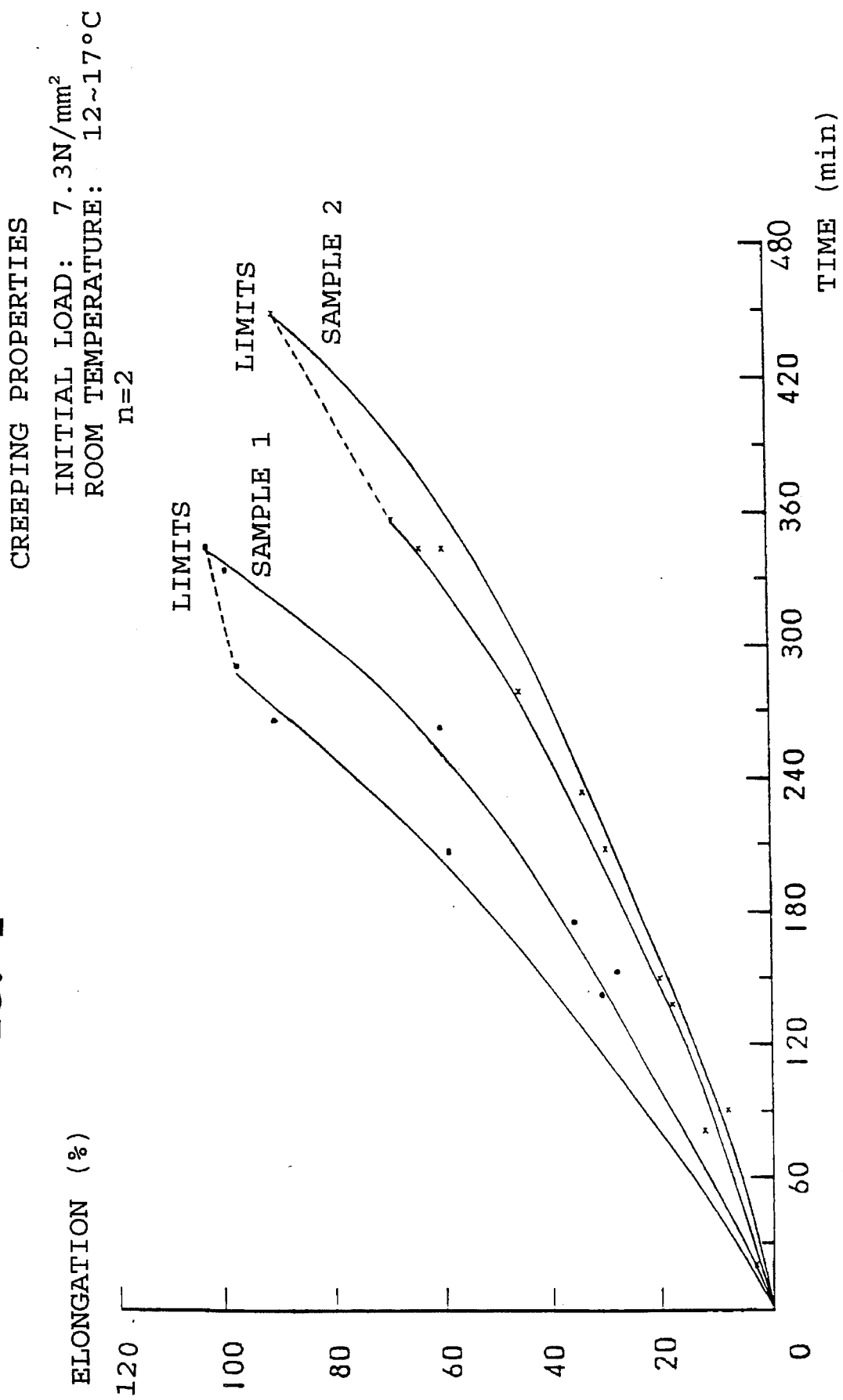
FIG. 2 is a graph showing the creeping properties discussed in Example 1.
Figure 3:
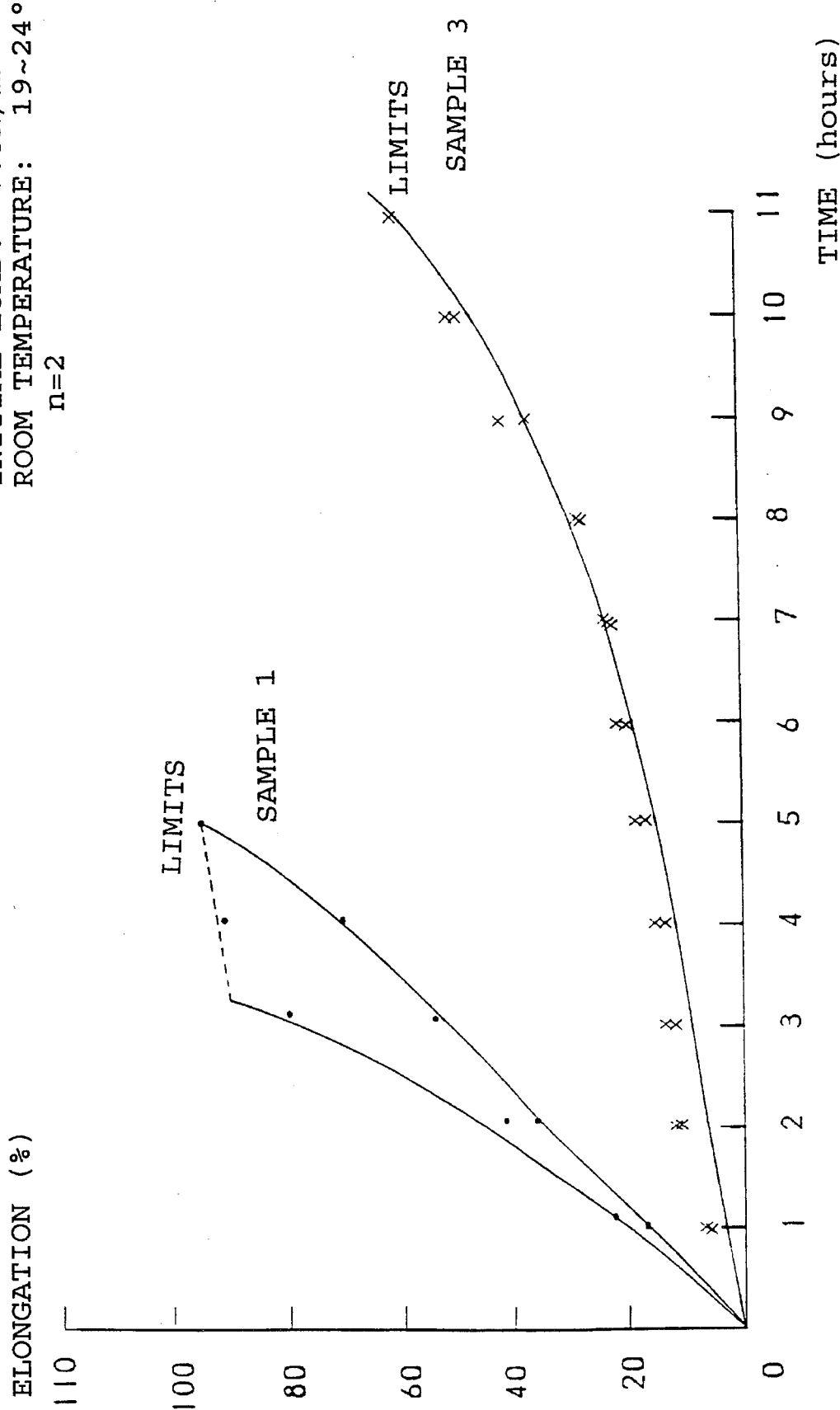
FIG. 3 is another graph showing the creeping properties discussed in Example 1.

Sample 1 is a solder alloy of this invention. FIG. 2 and FIG. 3 each shows the comparison of each creeping properties of Sample 1 and Sample 3 as well as the comparison of Sample 1 and Sample 3 observed in the room temperature of 12° to 17° C. and 19° to 24° C. respectively. Both of these figures plot each elongation data of the two sample stick solders by the time elapsed. The two graphs identically show that Sample 1 creeps faster than other solders and excels in elongation although the time until the occurrence of rupture is shorter. The thinkable reason is the fact that the crystal shifting takes place even with a smaller force and also the fact that the properties alleviating a stress inflicted upon the outside could have some bearings.

EXAMPLE 2

Figure 4:
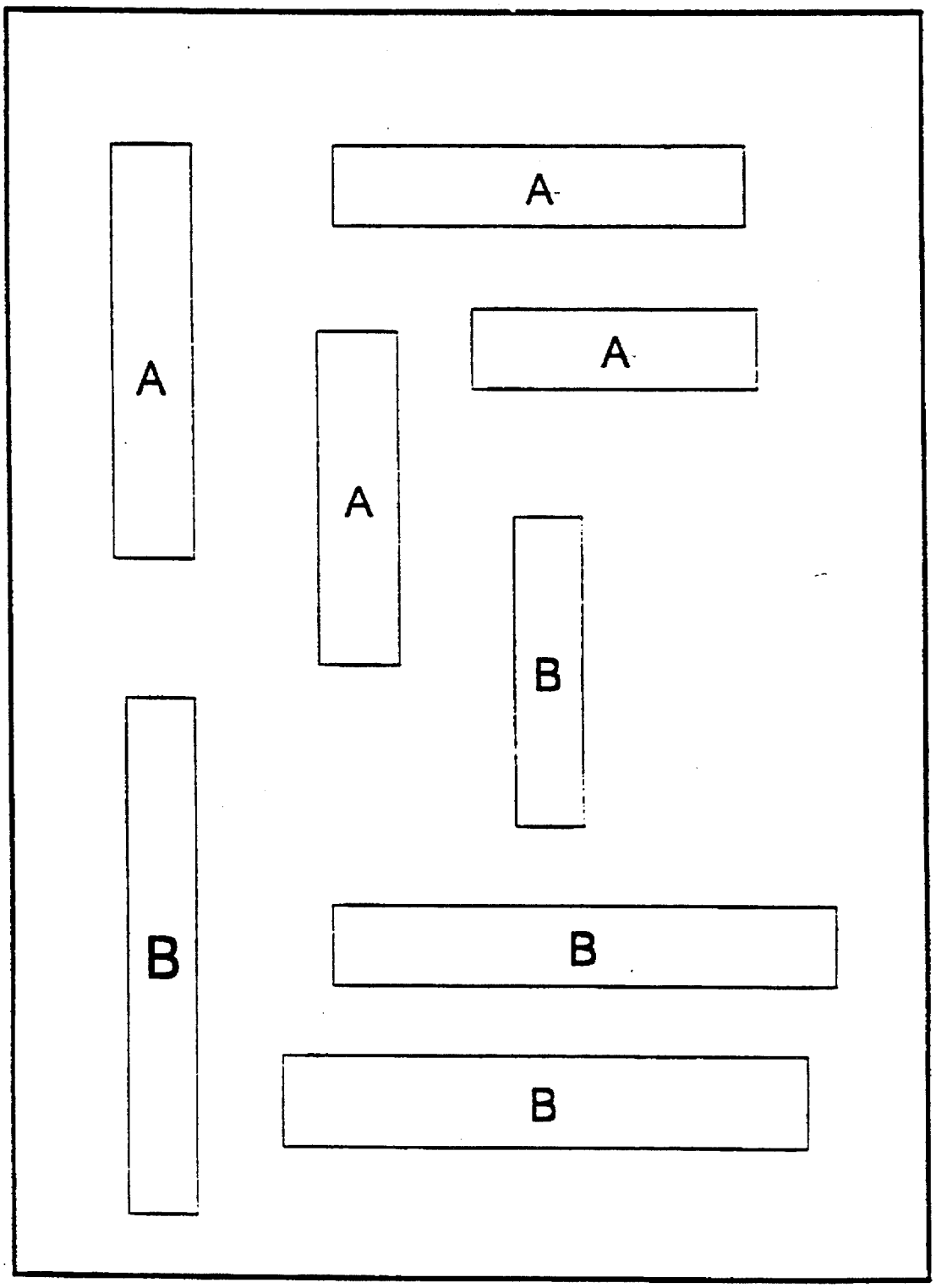
FIG. 4 is a plan view of the arrangement of a printed circuit board prepared for embodiment of Example 2.

Heat shock resistance tests were conducted on this inventive solder alloy as well as on other alloys with different composition. A printed circuit board used for this invention is as shown in FIG. 4. It is a single sided board made of paper phenol. After soldering all the pins to be fixed onto the two kinds of connector, one having eight pieces of pins (A) and the other having fifteen pieces of pins (B), each arranged for 2.5 mm pitch, the heat cycle tests were conducted at 100 cycles and 200 cycles respectively. The connectors used were both made of nylon 66 for body. The pins were those made of brass, pre-coated with Sn. Soldering was carried out by using RA type rosin based flux and immersing into a controlled solder bath. The soldering temperature was 250°±1° C. for all sample. After soldering, the test material was left for one whole day, and then the soldered fillet section was checked with a magnifying glass of ten magnification to investigate if the quantity of solder was adequate and also to see if there was any presence of abnormality in appearance to make sure the sample were perfect. Thereafter, the samples were placed in an air heat shock chamber which temperature ranged from minus 40° C. to plus 80° C. The condition under which each sample exposed for thirty minutes to the respective temperature is regarded as one cycle. The sample have received only hot and cold heat shocks, disregarding the time in which they were left in a room temperature. After being exposed to heat cycle of 100 cycles and 200 cycles respectively, the samples were checked with a magnifying glass of ten magnification.

The sample solders used for the experiment are those four kinds as described below. Basically, Sample 2 is a solder alloy consisting of the ingredients of Sample 1 supplemented with Cu. Sample 4 is the one consisting of the ingredients of Sample 3 supplemented with Cu. Sample 3 and Sample 4 are the inventive solder alloys.

(Sample 1)

| Sn | 63% |
|---|---|
| Pb | 37% |

(Sample 2)

| Sn | 62.7% |
|---|---|
| Cu | 0.3% |
| Pb | 37% |

(Sample 3)

| Sn | 62.647% |
|---|---|
| Sb | 0.3% |
| Te | 0.05% |
| Ga | 0.003% |
| Pb | 37% |

(Sample 4)

| Sn | 62.53% |
|---|---|
| Sb | 0.16% |
| Fe | 0.008% |
| Ga | 0.002% |
| Cu | 0.3% |
| Pb | 37% |

The test result of Example 2 is shown in Table 1.

An appraisal was carried out, analyzing both the 8 pin connector and the 15 pin connector placed on a printed circuit board, and further investigating whether the connectors fixed on a printed circuit board are posed in parallel or at right angle with the grains of the PCB. The observation on the result was made, evaluating each condition, wherein the condition in which no abnormality was observed on solder fillet is defined as "0", and the condition in which the cracks were thoroughly spread all over the periphery as "6".

After inflicting heat cycle repeatedly for 100 times upon Sample 1, it was noted that most of the pins placed near the both ends of a connector were crumpled and some of these were even cracked. In the case of Sample 2, it was observed that the number of such pins about to be cracked increased more than two times, compared with the case of Sample 1. This indicates that the addition of Cu has worked adversely for Sn—Pb solder alloy, whereas, in the case of Sample 3, nothing abnormal was observed for 100 cycles. Moreover, nothing abnormal was observed either for Sample 4, as in the case of Sample 3, although Sb content is reduced half, Te content is limited one sixth and 0.3% of Cu in weight is added in supplement, when compared with Sample 3. This implies that the ingredients so added have not only worked favorably but also off-set the adverse effect of Cu.

The result of heat cycle repeatedly inflicted for 200 times upon Sample 1 was studied. It was observed that half the number of pins were cracked and the condition was deteriorated. The same experiment was carried out on Sample 2. There was also noted the progress of deterioration, as in the case of Sample 1, however, the difference between these two samples with respect to the degree of deterioration was noted rather narrowed, because the deterioration in Sample 1 was noted more in progress. In the case of Sample 3, the test result after exposed to the heat cycle of 200 times was almost similar to the one observed with Sample 1 at the one hundredth heat cycle inflicted upon it. Sample 4 was observed similar to Sample 3, as far as the state of deterioration is concerned. Not like the relation between Sample 1 and Sample 2, no adverse effect was observed as a result of adding Cu.

In the case of this inventive solder alloy, it is clear that the fatigues taking place at a soldered joint due to a heat cycle stress inflicted upon it are eliminated and the occurrence of poor joining is reduced, compared with a conventional solder.

As discussed in the above, thanks to this invention which has successfully developed a solder alloy, supplementing Sb as well as Te to comprise 57 to 65% of Sn, 0.1 to 0.5% of Sb, 0.002 to 0.05% of Te and balancing Pb, all in weight. There is no need of apprehension any more for the formation of solder bridges or poor wetting, both of which are loathed for assembling process of a printed circuit board conducted through a solder bath. This invention has made it possible to carry out a soldering operation most suitable for mass production.

Furthermore, intermetallic compounds produced as a result of adding Te, Sb and Cu not only keep the flowability of a solder free from weakening but also improve a smooth solder separation at the time when pulling a PCB out of a solder bath and increase the volume of a solder fillet. This physical properties has made possible not only to increase the applied volume of a solder but also to improve the strength of soldered joint.

Still furthermore, the Cu content so far considered evil has now helped solve the inherent problem of copper diffusion by means of adding Te, Sb and Ga and offer the most excellent solder alloy.

What is claimed is:

1. A solder alloy comprising:

57–65% tin;

0.1 to 0.5% antimony;

0.002 to 0.05% tellurium;

0.001 to 0.05% gallium; and the balance being lead, wherein all percentages are by weight.

2. The solder alloy of claim 1 further comprising:

0.1 to 0.3% copper, by weight.

* * * * *